United States Patent [19]

Sinclair et al.

[11] 3,889,554

[45] June 17, 1975

[54] ROLLER TRANSMISSION

[76] Inventors: Brett Jason Sinclair, 150-11 72nd Rd., Flushing, N.Y. 11367; Harold Youngelson, 647 Academy St., New York, N.Y. 10034

[22] Filed: Jan. 9, 1974

[21] Appl. No.: 431,922

[52] U.S. Cl. .................. 74/798; 74/206; 74/803
[51] Int. Cl. .................. F16h 13/06; F16h 13/10
[58] Field of Search .................. 74/206, 798, 803

[56] References Cited
UNITED STATES PATENTS

| | | | |
|---|---|---|---|
| 70,122 | 10/1867 | Rochow | 74/803 |
| 1,432,090 | 10/1922 | Simpson | 74/803 |
| 1,993,051 | 3/1935 | Dell | 74/798 |
| 2,293,407 | 8/1942 | Schirrmeister | 74/798 |
| 2,896,480 | 7/1959 | Michie | 74/798 |
| 3,453,907 | 1/1968 | Nogucki | 74/803 |
| 3,677,109 | 1/1971 | Stuemky | 74/208 |
| 3,705,522 | 12/1972 | Ogawa | 74/803 |
| R26,978 | 11/1970 | Hewko | 74/798 |

*Primary Examiner*—Samuel Scott
*Assistant Examiner*—Allan R. Burke
*Attorney, Agent, or Firm*—Peter L. Tailer

[57] ABSTRACT

A transmission has an input shaft, a fixed ring, a rotatably mounted driven ring, one ring being smaller than the other by a given amount, at least one roller having longitudinally displaced portions, one portion being smaller than the other by the same amount as the rings, and means enabling the input shaft to revolve the at least one roller within the rings with the smaller diameter portion rolling in the smaller ring and the larger diameter portion rolling with the larger ring to drive the rotatably mounted ring as an output. Modifications of the transmission provide conical rollers and corresponding conical rings, rollers and rings having surfaces which provide point contact therebetween, and a plurality of longitudinally displaced portions of rollers with a plurality of driven output rings.

1 Claim, 8 Drawing Figures

PATENTED JUN 17 1975

3,889,554

SHEET 2

3,889,554

ROLLER TRANSMISSION

BACKGROUND OF THE INVENTION

1. Field of the Invention

This invention involves transmissions which use rollers in place of gears.

2. Description of the Prior Art

For high gear ratio transmissions such as gear reductions of 100 to one and higher, the cost of conventional toothed gear transmissions is high. In these conventional gear transmissions, sliding friction reduces their mechanical efficiency. The transmission of this invention provides a more efficient transmission with fewer parts at a reduced cost for many applications.

SUMMARY OF THE INVENTION

A roller transmission has a fixed ring and a rotatably mounted ring which serves as an output. An input shaft revolves a roller having two portions, each portion rolling within a ring. The ratio between the diameter of one portion of the roller and the diameter of the ring it rolls within and the ratio between the diameter of the other portion of the roller and the diameter of the ring it rolls within differ so that the roller drives the rotatably mounted ring as an output of the transmission. The speed change between the input shaft and the output ring is determined by the relative sizes of the portions of the roller and of the rings.

While a plurality of cylindrical rollers revolving within and rolling within a fixed ring and a rotatably mounted ring is a preferred embodiment of this invention, conical rollers may also be used with conical rings to provide line contact between the rollers and the rings. Cylindrical roller portions roll within rings having cylindrical inner surfaces to provide line contact with no sliding friction, the difference in the diameters of the roller portions being the same as the difference in the diameters of the rings. In high speed applications, centrifugal force may provide roller contact against the rings to give a high torque output. In low speed applications and even in some high speed applications, springs force the rollers against the rings. The rings and the roller portions may have surfaces that are other than cylindrical or conical if point contact is used in the transmission.

DESCRIPTION OF THE PREFERRED EMBODIMENTS

Figure 1:
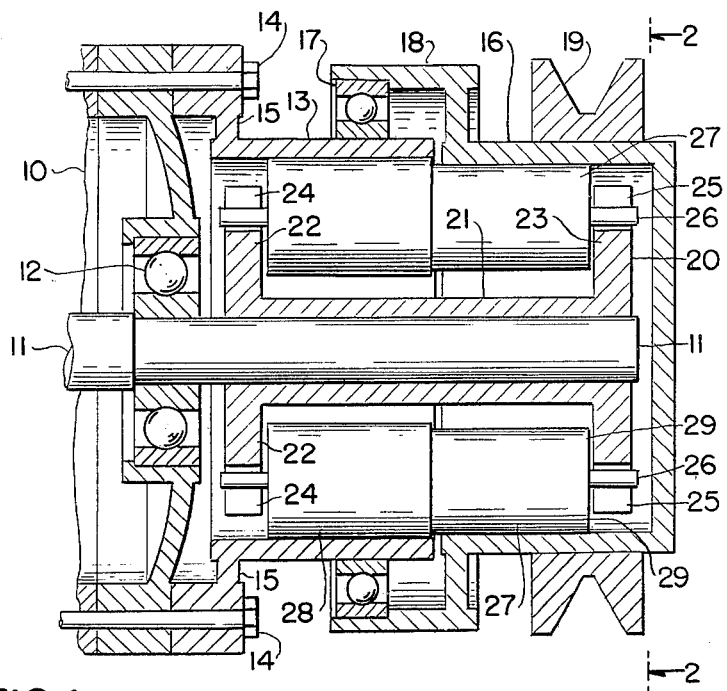
FIG. 1 is a longitudinal section through a broken away end of an electric motor and an attached transmission according to this invention.
Figure 2:
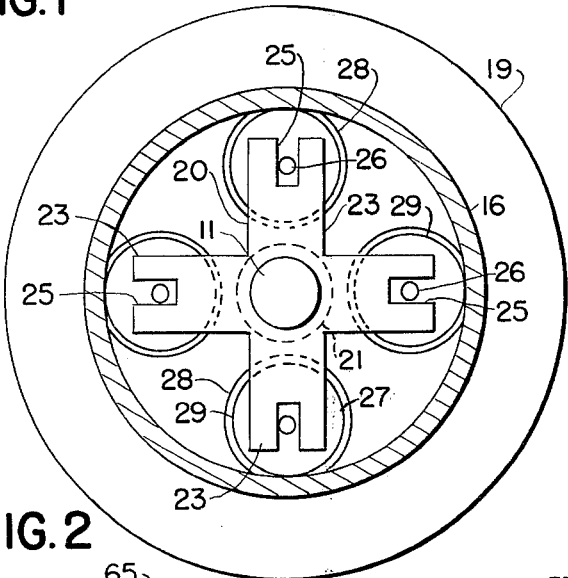
FIG. 2 is a transverse section taken on line 2—2 of FIG. 1.

As shown in FIGS. 1 and 2, the end bell 10 of an electric motor mounts its motor shaft 11 in bearing 12. A fixed ring 13 is secured in front of end bell 10 around shaft 11 by the motor bolts 14 and mounting flange 15. Flange 15 and ring 13 may be integrally formed. A rotatably mounted ring 16 is journalled by bearing 17 and flange 18 to extend around the end of shaft 11. Ring 16 is the transmission output and has a V-belt pulley 19 or the like mounted thereon.

A spider 20 is mounted on shaft 11. Spider 20 has a tubular center 21 with inner arms 22 and outer arms 23 projecting therefrom. Radial slots 24 in the ends of arms 22 and radial slots 25 in the ends of the arms 23 receive the axles 26 of the rollers 27. Each roller 27 has a larger diameter portion 28 and a smaller diameter portion 29.

When shaft 11 is rotated clockwise as shown in FIG. 2 and fixed ring 13 is 3 inches in diameter, output ring 16 is 2.997 inches in diameter, roller portion 28 is 1 inch in diameter, and roller portion 29 is .997 inches in diameter, then for each revolution of shaft 11, output ring 16 will be driven substantially .001 revolutions and it requires substantially one thousand revolutions of shaft 11 to rotate output ring 16 once.

The roller portions 28 and 29 make line contact with the rings 13 and 16. Centrifugal force ensures good roller contact pressure and high torque output at conventional motor speeds. Since there is no roller contact with the rings 13 and 16 when shaft 11 is at rest, there is no initial starting load on the motor of shaft 11. The transmission of FIGS. 1 and 2 is inexpensive to fabricate for low output speed drives having a high speed reduction. The rollers 27 and the rings 13 and 16 may be machined to size and hardened. If desired, the rollers 27 can be machined with the portions 27 and 28 of the same size and the rings 13 and 16 of the same diameter. Portions 28 of the rollers and the inner surfaces of the ring 16 can then be plated in the same bath for the same length of time to increase the diameters of the portions 28 of the rollers 27 and decrease the diameter of the ring 16 by the same amount. In these manners high ratio accurate reduction transmissions may be made for a wide variety of applications. Inexpensive units can be used to open garage doors, operate control mechanisms, etc.

Figure 4:
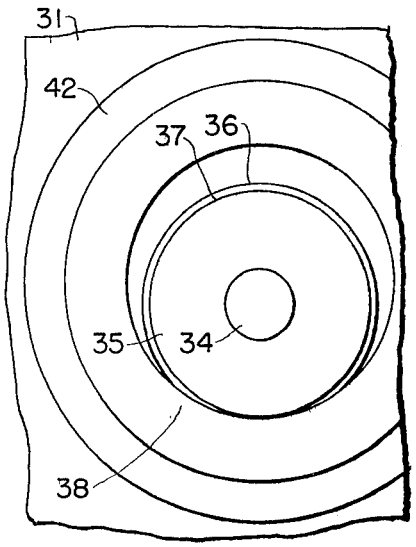
FIG. 4 is an end view of the transmission of FIG. 3.
Figure 3:
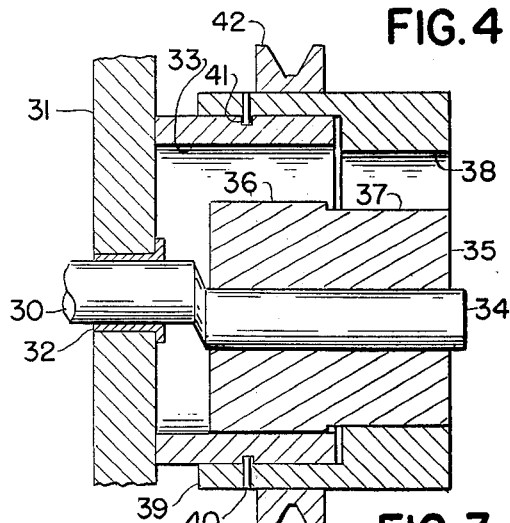
FIG. 3 is a longitudinal section through a second embodiment of the transmission of this invention.

As shown in FIGS. 3 and 4, a second embodiment of this invention has an input shaft 30 mounted in frame 31 by bearing 32. A fixed ring 33 is welded to frame 31 about the offset 34 of shaft 30. A single roller 35 is mounted on offset 34 to have a larger diameter portion 36 roll in ring 33 and have a smaller diameter portion 37 extend beyond ring 33. A rotatably mounted ring 38 is mounted by a tubular extension 39 which extends over ring 33. Pins 40 in extension 39 extend into an annular groove 41 in ring 33 to rotatably retain ring 38. The smaller diameter portion 37 of roller 35 rolls in ring 38 to drive it as an output. The output ring 38 has a V-belt pulley 42 or the like mounted on its extension 39. Roller 35 may be made of relilient material to ensure its making contact with rings 33 and 38.

Figure 6:
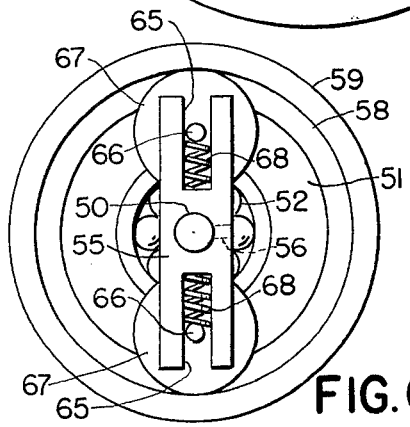
FIG. 6 is an end view of the transmission of FIG. 5.
Figure 5:
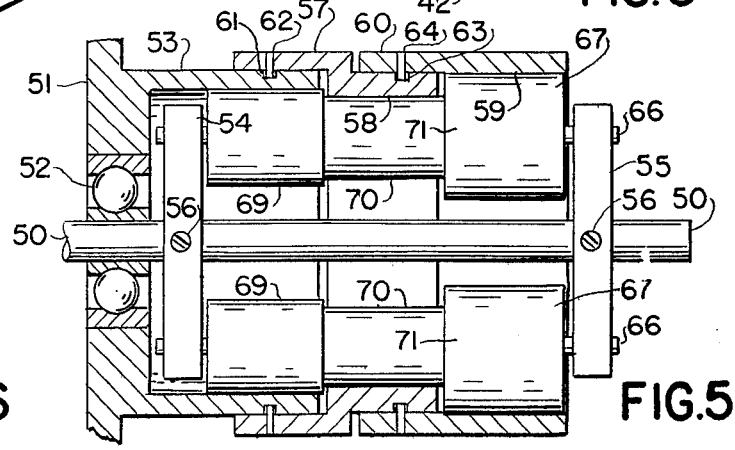
FIG. 5 is a longitudinal section through a third embodiment of this invention having two output rings.

As shown in FIGS. 5 and 6, an input shaft 50 is mounted in a plate 51 by means of the ball bearing 52. A fixed ring 53 is integrally formed with plate 51 to extend about shaft 50. Inner and outer two arm spiders 54 and 55 are fixed to shaft 50 by set screws 56. By means of a tubular overlapping flange 57, a smaller ring 58 is rotatably mounted adjacent to fixed ring 53. A larger ring 59 is rotatably mounted on ring 58 by an extension 60 thereof. An annular groove 61 in ring 53 and pins 62 entering therein from flange 57 secure the ring 58 on ring 53. An annular groove 63 in ring 58 is entered by pins 64 from extension 60 to rotatably mount ring 59.

The spiders 54 and 55, as shown in FIG. 6, have radial slots 65 therein to receive the axles 66 of the rollers 67. Compression springs 68 urge the axles 66 outward so that the inner portions 69 of rollers 67 roll in the fixed ring 53, the smaller portions 70 roll in the smaller ring 58, and the larger portions 71 roll in the larger ring 59. If shaft 50 rotates clockwise as shown in FIG. 6, ring 58 and flange 57 will also rotate clockwise although at a greatly reduced speed. Ring 59 will rotate counter clockwise also at a greatly reduced speed. Any suitable output drive means (not shown) may be fixed to flange 57 and ring 59. Thus this embodiment of the transmission provides two counter rotating outputs. As many driven output rings as desired may be provided in the transmission of this invention.

Figure 7:
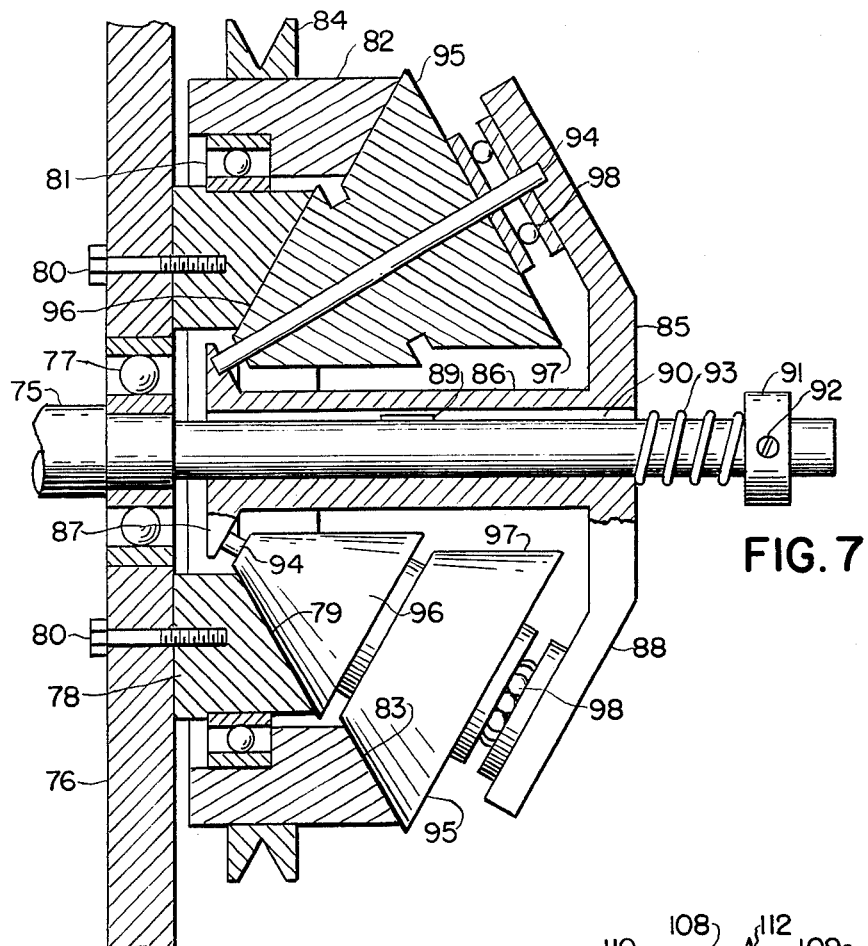
FIG. 7 is a longitudinal section through a fourth embodiment of this invention having conical rollers.

Referring now to FIG. 7, an input shaft 75 is rotatably mounted in frame plate 76 by bearing 77. A fixed ring 78 having a conical surface 79 is bolted to frame 76 with bolts 80 so that surface 79 extends about shaft 75. By means of a ball bearing 81 a second ring 82 having a conical surface 83 is rotatably mounted about shaft 75. A power takeoff 84 in the form of a V-belt pulley is fixed on ring 82.

A spider 85 is slidably mounted on shaft 75. Spider 85 has a tubular center portion 86 with inner and outer arms 87 and 88 integrally formed therewith. A key 89 projecting from shaft 75 enters a keyway 90 in center portion 86 so that spider 85 rotates with shaft 75. A collar 91 is fixed on shaft 75 by set screw 92 so that a compression spring 93 urges spider 85 towards frame 76. Axles 94 mount the cone shaped rollers 95 having larger inner portions 96 and stepped in proportionately smaller outer portions 97. Thrust bearings 98 enable spider 85 and spring 93 to hold roller portions 96 and 97 against ring surfaces 79 and 83 to drive ring 82. As shown, input shaft 75 will drive ring 82 in the same direction at greatly reduced speed. The conical rollers 95 make line contact for good torque transmission.

Figure 8:
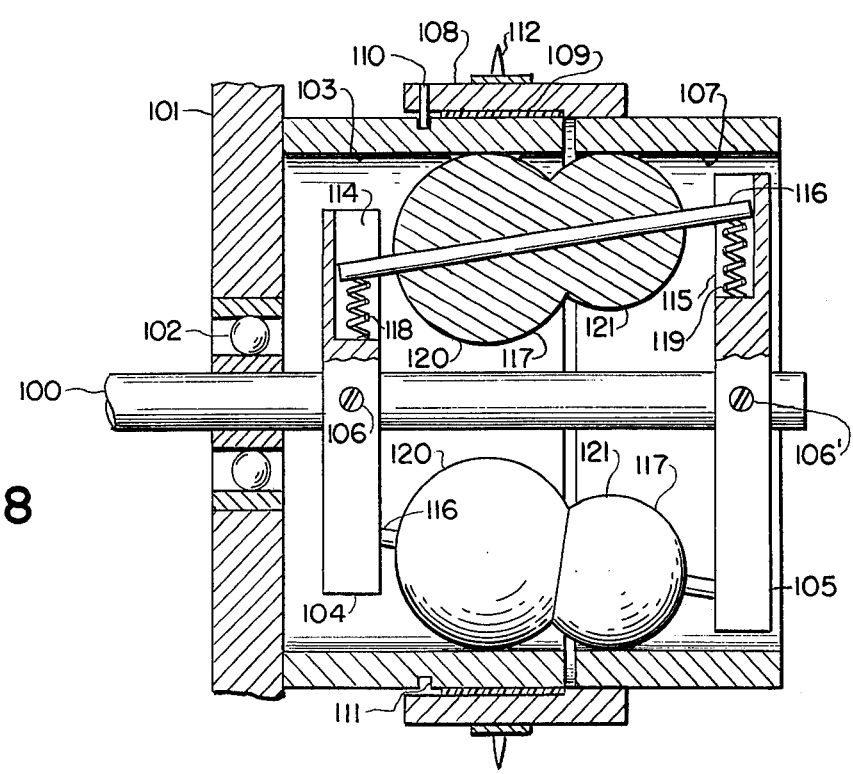
FIG. 8 is a longitudinal section through a fifth embodiment of this invention having rollers with spherical portions making point contact with fixed and rotatably mounted rings.

Referring now to FIG. 8, a shaft 100 is rotatably mounted in a frame plate 101 by a bearing 102. A fixed ring 103 is welded to to frame 101. Inner and outer spider arms 104 and 105 are fixed to shaft 100 by set screws 106 and 106'. A rotatably mounted ring 107 has a tubular flange 108 which rotates about ring 103 on bearing 109 and is secured in place by pins 110 which enter the annular groove 111. A sprocket 112 or other takeoff means is mounted on flange 108.

The spiders 104 and 105 contain slots 114 and 115 in which axles 116 of the rollers 117 are secured. Compression springs 118 and 119 urge the rollers 117 against the rings 103 and 107. Each roller 117 has a larger spherical portion 120 rolling on fixed ring 103 and a smaller spherical portion 121 rolling on the rotatably mounted output ring 107. Although the rings 103 and 107 are the same diameter, the rotation of shaft 100 will drive the ring 107 in the same direction at a reduced speed. The point contact between the portions 120 and 121 and the rings 103 and 107 limit the torque output of this embodiment of the invention. If desired, the portions 120 and 121 of the rollers 117 could have other than spherical surfaces as they could have surfaces generated by the revolution of any curve.

While the transmission of this invention has been shown made of steel, it could be fabricated of hard rubber, plastic, or other material. For some applications, the rollers may be made of resilient material and the rings may be lined with high friction linings.

Although this invention has been shown and described in the best forms known, these are purely exemplary and modifications may be made without departing from the spirit of the invention.

What is claimed is:

1. A roller transmission comprising, in combination, an input shaft, a fixed ring disposed about said shaft, a rotatably mounted ring disposed about said shaft, said rings having larger and smaller cylindrical inner surfaces, rollers each having larger and smaller cylindrical portions, said larger and smaller cylindrical portions of said rollers differing in diameter the same amount as the larger and smaller cylindrical inner surfaces of said rings, and a spider mounted on said shaft, said spider having pairs of arms containing radial slots receiving said axles, each pair of said arms mounting one of said rollers therebetween, said spider revolving said rollers with said shaft so that on rotation of said shaft centrifugal force urges said rollers outward moving said axles in said slots, said larger cylindrical portion of each roller rolling against said larger cylindrical inner surface of a ring and said smaller cylindrical portion of each roller rolling against said smaller cylindrical inner surface of a ring driving said rotatably mounted ring as an output of said transmission.

* * * * *